May 15, 1951
H. H. DINKINS, JR
2,552,846
POWER UNIT FOR BICYCLES
Filed Feb. 25, 1948
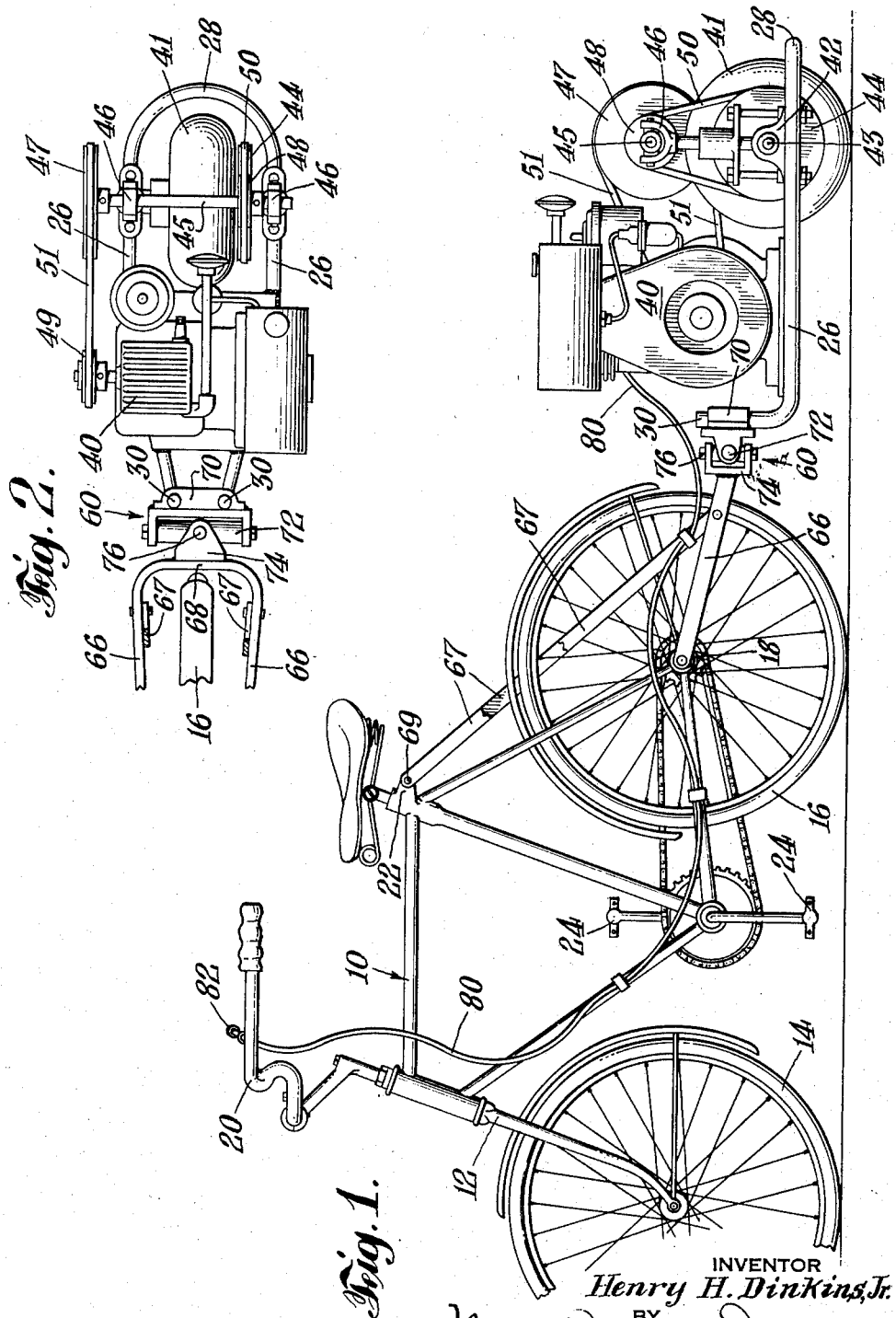
INVENTOR
*Henry H. Dinkins, Jr.*
BY
*Morgan, Finnegan & Durham*
ATTORNEYS Patented May 15, 1951

2,552,846

UNITED STATES PATENT OFFICE 2,552,846

POWER UNIT FOR BICYCLES

Henry H. Dinkins, Jr., Harrison, N. Y.

Application February 25, 1948, Serial No. 10,623

4 Claims. (Cl. 180—11)

The present invention relates to a new and improved power unit particularly adapted for the self-propulsion of bicycles.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Figure 1 is a side elevation of a bicycle having my power unit attached thereto; and Figure 2 is a fragmentary plan view of the parts shown in Figure 1.

The present invention has for its object the provision of a novel and improved power unit for bicycles which is easily attached to and detached from the bicycle and which gives a more stable ride than is usual with devices of the prior art. A further object is the provision of a power unit which does not interfere with the steering of the bicycle which requires only a single control for its operation and which follows closely the normal path of the rear bicycle wheel. Still another object is the provision of a self-propelled wheeled unit which is provided with connecting means by which the power is applied from behind and in line with the bicycle during normal straight travel and serves to help steer the bicycle on turns.

As embodied, the power unit comprises a frame having a single wheel driven from a prime mover under control of the rider and preferably through speed responsive clutch means, so that the prime mover is automatically disconnected when its speed is reduced. The wheel is preferably near the rear of the frame, the frame is low enough so that its center of gravity is approximately in line with or below the axes of the bicycle wheels and the frame is connected at its front end to a member fixed with reference to the bicycle frame adjacent the rear edge of the rear wheel and horizontally alined with or below the bicycle wheel axis and in the same vertical plane as the rear wheel. This connection may be a universal joint, but preferably has only two degrees of freedom, about a horizontal transverse axis and a substantially vertical axis. The distance from the connecting joint to the unit wheel is preferably from 1¼ to 1¾ times the distance from the connection to the rear bicycle wheel axis, so as to cause the unit wheel to track closely with the rear bicycle wheel on normal turns as well as during straight riding, thereby adding to the stability of the ride and reducing the power required in heavy going such as light snow, mud, gravel or sand.

It will be understood that the foregoing general description and the following detailed description as well are exemplary and explanatory of the invention but are not restrictive thereof.

Referring now in detail to the preferred and illustrative embodiment shown in the accompanying drawings, the bicycle comprises a conventional bicycle having a frame 10, a steering fork 12, front wheel 14, rear wheel 16 with coaster brake 18, handle bars 20, seat post clamp 22 and pedals 24.

The power unit comprises a frame bent from a metal tube or otherwise fabricated and providing a horizontal bed 26 with a rounded rear portion 28 and upbent ends 30. On the bed, near a tired wheel 41, is mounted a small internal combustion motor 40, generally a gasoline motor of from 1 to 3 horsepower while near the rear end and between the parallel horizontal reaches of the bed 26 is mounted the tired wheel 41, journalled in bearings 42 by shaft 43 on which is connected a V-belt pulley 44. Above wheel 41 is a jack shaft 45 journalled in adjustable bearings 46 which are supported on journals 42. Shaft 45 has a large V-belt pulley 47 and a small V-belt pulley 48, pulley 47 being driven from the motor 40 by pulley 49 on the motor shaft through belt 51, while pulley 48 drives pulley 44 through belt 50, forming a reduction drive from the motor 40 to the wheel 41.

For more easily controlling the power unit, motor pulley 49 is a clutch, and preferably a centrifugal clutch, engaging when the motor is speeded up substantially above idling speeds. Thus the operator need only control the motor speed, and no separate clutching and declutching operation is needed.

The power unit is connected to the rear of the bicycle and in line with the bicycle frame 10 by means of an articulated joint 60 providing a transverse pivotal axis and a vertical pivotal axis rigidly connected just behind the rear bicycle wheel 16 and preferably slightly below the axis of the coaster brake 18. The rigid fixed connection with the bicycle is provided by means of a braced frame connected to the bicycle seat post clamp 22 and the coaster brake axis. The braced frame comprises two members 66 and 67 at each side of the wheel 16 and joined together by a cross member 68, the lengths of the members 66 and 67 being such that the member 68 is located just behind the wheel 16 and at the level of or slightly below the axis of brake 18. The upper ends of member 67 are fastened by the tightening bolt 69 for the seat post, while the forward ends of the members 66 are secured by the usual nuts at the ends of the coaster brake shaft.

Between the braced frame and the power unit is an articulated connection having at least two degrees of freedom, one about a horizontal axis, the other about a vertical axis forming a thrust transmitting connection from the power unit to the bicycle. As embodied, a bracket 70 joins the ends 30 of the frame and supports a transverse horizontal axis 72 while a bracket 74 is secured to the cross member 68 and supports the vertical axis 76. The axes 72 and 76 may be formed as an integral cruciform piece having cap screws threaded into the ends of each arm.

For controlling the speed and power output of the motor 40, a push pull control 80 is connected to the throttle and may be manually actuated by a manual control member 82 mounted on the handlebar 20.

Preferably, when the power unit is used with a conventional bicycle having twenty-eight inch wheels and a spacing of about forty-one inches between the front and rear wheels on the road, the articulated connection is located some sixteen inches behind the coaster brake shaft, while the power unit wheel engages the road from twenty inches to twenty-eight inches behind the articulated connection. The center of gravity of the power unit is at least as low as the shaft 18, and the weight distribution of the power unit is such that only about one-third of its weight is applied to the articulated connection, while the lever ratio between the articulated connection and the road engaging point of the front wheel 14, with the shaft 18 considered as the fulcrum, is about 1 to 3, thereby applying only about $\frac{1}{5}$ to $\frac{1}{12}$ and preferably $\frac{1}{8}$ of the weight of the power unit tending to lift the front wheel from the ground. Thus there is given sufficient pressure for good steering and stability while the bicycle is standing at rest and unmounted.

The distances between shaft 18, the road engaging point of the wheel 41 and the articulated joint insure close tracking of the wheels 41 and 16 when turning normally.

Also, when turning to one side, the articulated joint is oppositely moved causing the thrust of motor 40 to be applied to assist in the turn.

The invention in its broader aspects is not limited to the specific mechanisms shown and described but departures may be made therefrom within the scope of the accompanying claims without departing from the principles of the invention and without sacrificing its chief advantages.

What is claimed is:

1. A power unit for bicycles including in combination a frame having a single road wheel near its rear end thereof, an articulated connection at its front end, a prime mover on the frame positioned between said road wheel and said connection connected to drive the wheel, and a second frame connected to the articulated connection, and bracing means extending angularly from said second frame from a point adjacent the articulated connection, said second frame and said bracing means connectable with a bicycle at vertically spaced points on the bicycle frame to fix the articulated connection behind the rear bicycle wheel and not above its axis.

2. A power unit as claimed in claim 1 in which the articulated connection is directly behind the rear bicycle wheel and provides a transverse and a vertical axis of pivotal movement.

3. A power unit as claimed in claim 2 in which the articulated joint is spaced from the road engagement of the unit wheel from $1\frac{1}{4}$ to $1\frac{3}{4}$ times as far as from the road engagement of the rear bicycle wheel.

4. A power unit as claimed is claim 3 in which the center of gravity of the unit is lower than the rear bicycle wheel axle.

HENRY H. DINKINS, Jr.

REFERENCES CITED

The following references are of record in the file of this patent:

UNITED STATES PATENTS

| Number | Name | Date |
|---|---|---|
| 2,429,153 | Ammon et al. | Oct. 14, 1947 |

FOREIGN PATENTS

| Number | Country | Date |
|---|---|---|
| 457,656 | Germany | Mar. 21, 1928 |
| 884,697 | France | May 3, 1943 |